Oct. 12, 1926.  
S. ANGROVE  
1,603,104  
TOWING AND STEERING DEVICE  
Filed March 17, 1925
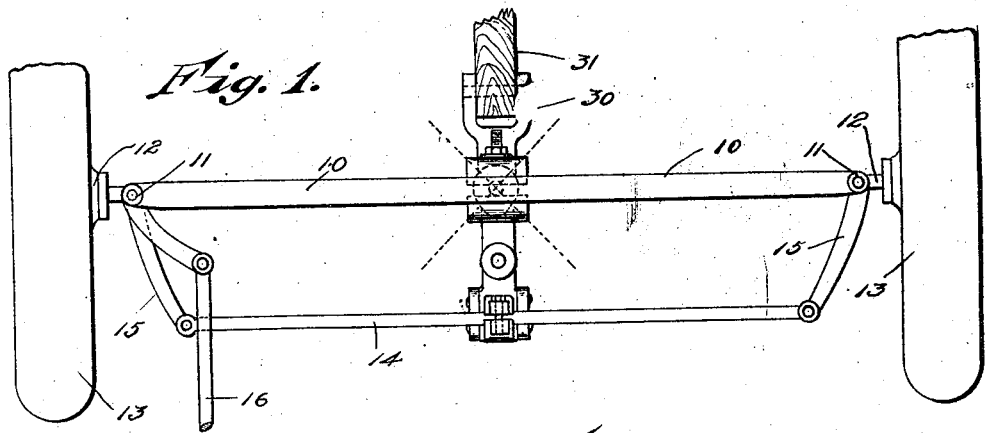
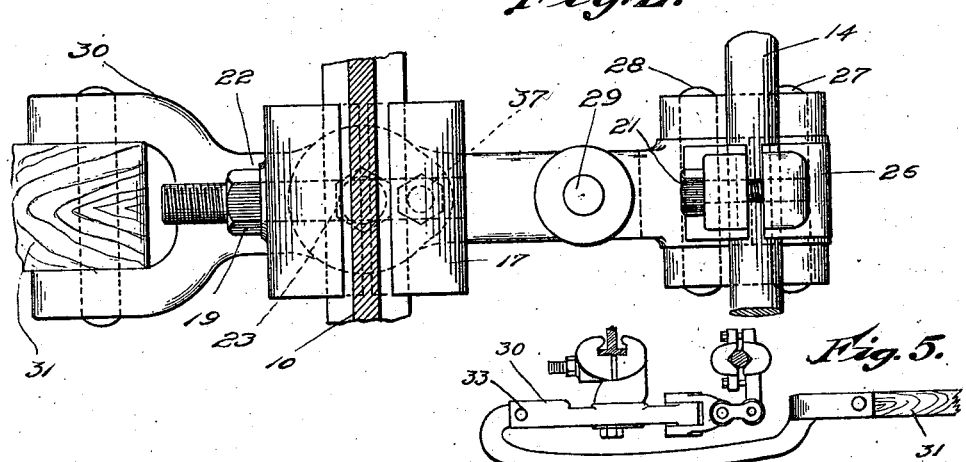
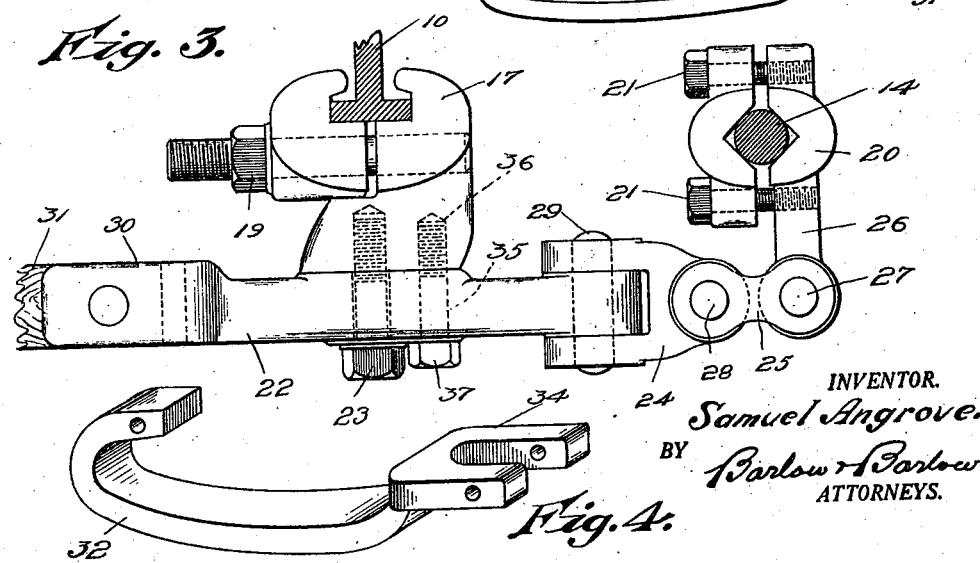
INVENTOR.  
Samuel Angrove.  
BY Barlow & Barlow  
ATTORNEYS.

Patented Oct. 12, 1926.

1,603,104

UNITED STATES PATENT OFFICE.

SAMUEL ANGROVE, OF PROVIDENCE, RHODE ISLAND.

TOWING AND STEERING DEVICE.

Application filed March 17, 1925. Serial No. 16,254.

This invention relates to an improved construction of combined towing and steering device for vehicles; and has for its object to provide a device of this character adapted to be readily connected to the axle and to the steering tie-rod of the usual motor vehicle, the device being also provided with a tow pole, by a movement of which pole the tie-rod will be moved relatively to the axle to swing the wheels and steer the vehicle being towed, without necessitating a person being at the steering wheel of that vehicle.

A further object of the invention is the provision of a clamp for the axle, a clamp for the steering tie-rod and a lever pivoted to the axle clamp and connected to the tie-rod clamp through a set of compensating links, whereby a change in the distance between the tie-rod and the axle during the steering motion, is compensated for.

A still further object of this invention is the provision of means whereby the steering wheels may be locked against a steering or swinging action during the towing operation particularly where the rear wheels are lifted free from the ground and the vehicle is being towed backwards.

The invention further consists in the provision of a towpole extension member which is adapted to be connected to the free end of the lever to extend back beneath the lever and to which the towpole may be connected for use in cases where the steering tie-rod is located in front instead of at the rear of the vehicle axle.

With these and other objects in view, the invention consists of certain novel features of construction, as will be more fully described, and particularly pointed out in the appended claims.

In the accompanying drawings:

Figure 1 is a top view showing the front axle of a vehicle and its steering tie-rod and my improved towing and steering device as clamped in operating position to both these members.

Figure 2 is an enlarged top view of my improved towing and steering device showing a portion of the axle in section and a portion of the tie-rod; also a portion of the tow pole.

Figure 3 is a side elevation of the construction illustrated in Figure 2.

Figure 4 is a perspective view of the towpole extension member which is adapted to be employed when the tie-rod is positioned in front of the forward axle instead of in the rear thereof.

Figure 5 illustrates the tow-pole extension member in operating position.

It is found in towing motor vehicles such as automobiles and the like, where its wheel bearings are pivotally attached to the forward axle to swing relatively thereto and the two wheels are connected together through a steering tie rod, of advantage to provide a device by which the vehicle may be towed and properly guided without the necessity of employing a person at the steering wheel of the vehicle being towed, and to accomplish this in a simple and effective way, I have provided a device which may be readily clamped to the axle of the vehicle and also to the steering tie-rod thereof and the two connected by a lever operatively pivoted to one of these clamps and connected to the other through a set of compensating links to take care of the changes in distance between the tie-rod and axle while steering. It is also found of advantage to be able to lock the lever and tie-rod so as to prevent the wheels from swinging during the towing of the vehicle backward with its rear wheels raised from the ground. It is also found to be of advantage in the use of this device to employ a towpole extension member to be used where the steering tie-rod is positioned in front of the axle, and in which case it is necessary to turn my device end for end and in such cases the extension is used to connect the free end of the lever, which is, in this case, at the rear, to the towpole, as is illustrated in Figure 5; and the following is a detailed description of the present embodiment of my invention showing one means by which these advantageous results may be accomplished:—

With reference to the drawings, 10 designates the forward axle of the usual motor vehicle on the ends of which the trunnions 12 are pivoted at 11 and on which trunnions the wheels 13 are mounted. These trunnions are connected together by a tie-rod 14 through the arms 15, and a steering or swinging action of these wheels is imparted from the usual hand-steering wheel of the vehicle (not shown), through the connecting rod 16.

In order to provide simple and effective means for steering the vehicle without the necessity of employing a man at the steering wheel, I have formed a clamping member 17 which is adapted to grip the front axle 10 of the vehicle by screwing up the nut 19 to close its jaws, and in order to connect this device to the tie-rod 14, I have provided a clamp 20 adapted to grip this rod by setting up the bolts 21, to close its jaws upon the rod.

In order to impart a steering or endwise movement to this rod 14 relatively to the axle 10, I have provided a lever 22 which is pivoted to the clamp 17 on the bolt 23, the rear end of this lever being pivotally connected through the two links 24 and 25 to the downwardly-extending arm 26 of the clamp 20, whereby these two links serve to provide a universal joint which will accommodate itself to and compensate for the varying distances between the tie-rod and the axle during its endwise movement in swinging the wheels to perform a steering action. The pair of links 25 being pivoted to the arm 26 by a pin 27 and are pivoted to the end of link 24 through a pin 28, while link 24 has a vertically-disposed pin 29, which arrangement of pivoting permits of a universal movement.

Ordinarily this tie-rod 14 is located to the rear of the axle 10 and when so located the free forked end 30 of the lever 22 serves to receive the tow-pole 31, the opposite end of which ordinarily is firmly connected to the rear of the vehicle doing the towing, whereby a lateral movement of this outer end of the pole causes the lever 22 to swing on its pivot 23 and to move the tie-rod 14 endwise thus causing the wheels 13 to swing on their respective pivots to automatically steer the vehicle being towed and cause it to follow the one ahead and that without the necessity of positioning a man at its steering wheel.

In some instances, where the tie-rod 14 is in front of the axle 10, the lever 22 is reversed end for end, the forked end 30 being then at the rear and in order to attach the towpole to this forked rear end of the lever, I have provided a towpole extension member 32 which is arranged to be pivotally connected at 33, see Figure 5, to the end 30 of the lever and to extend forwardly beneath this lever. This extension member is also provided with a forked end 34 which receives the end 31 of the towpole and by a swinging movement of the towpole through the extension, the proper steering movement is imparted to the wheels of the vehicle to cause it to follow the one ahead doing the towing.

In some instances, where a serious injury has been caused to the rear of the vehicle, this end is lifted from the ground and the vihicle is towed backwards permitting its forward wheels to rest upon the ground, and in this case it is desired to lock these forward wheels against a steering movement, and to accomplish this in a simple and effective way, I have provided a hole 35 in the lever, offset to one side of its pivot pin and I have tapped a hole 36 in the clamping member 17 and in these holes I position a screw 37 which rigidly holds the lever against a swinging motion and thus secures the wheels against any steering or swinging action permitting the vehicle to be towed backwards without the necessity of employing another person in the vehicle for steering the same.

My improved device is extremely simple and practical in construction and is effective in its operation and by its use a vehicle may be towed forward by use of a towpole or backward by lifting its rear wheels and locking its front wheels against a steering movement, without the necessity of employing a second person for steering the vehicle being towed.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a towing and steering device for vehicles, a clamp for gripping the axle, a clamp for gripping the steering tie-rod, a lever pivoted to the axle clamp and connected through a universal joint to said rod clamp, said joint being arranged to compensate for distance between said clamps, and a towpole connected to the opposite end of said lever through which the tie-rod may be moved to steer the vehicle.

2. In a towing and steering device for vehicles, a clamp for gripping the axle, a clamp for gripping the steering tie-rod, a lever pivoted to the axle clamp and a universal joint comprising a set of two links pivoted at right angles to each other connecting one end of said lever to said tie-rod clamp, whereby to compensate for varying distances and heights between the axle and tie-rod.

3. In a towing and steering device for vehicles, a clamp for gripping the axle, a clamp for gripping the steering tie-rod, a lever pivoted to the axle clamp and a bifurcated member, a pivot pin connecting the same to said lever, and links connecting said member and tie-rod clamp by pivot pins disposed at right angles to the first of said pins.

4. An attachment for the steering mechanism for a towed automobile or the like comprising clamping jaws for the axle, clamping jaws for the steering tie-rod, and means for connecting said jaws to prevent relative movement between said axle and rod.

5. An attachment for the steering mechanism for a towed automobile or the like comprising clamping jaws for the axle, clamping jaws for the steering tie-rod, and means adjustable in length to accommodate different distances between said rod and axles for rigidly connecting said jaws to prevent relative movement between said axle and rod.

6. A steering attachment for towing an automobile or the like, comprising clamping jaws for gripping the axle, clamping jaws for gripping the steering tie-rod of the vehicle, a steering lever pivotally mounted on one of said jaws and connected to the other for imparting a steering movement to said tie-rod, and means for locking said lever against pivotal movement for preventing a relative endways movement between said axle and rod to lock the wheels against steering movement.

7. In a steering attachment for towing an automobile or the like, a clamp for gripping the axle, a lever pivoted to said clamp and having means at one end for connecting to the steering tie-rod of the vehicle, whereby a movement of the lever about its pivot moves said rod endwise relatively to said axle to steer the vehicle, and a bolt passing through said lever into said axle clamp for locking said lever against a swinging movement to prevent a steering action on the wheels.

8. In combination with a vehicle having the steering tie-rod forward of the front axle, a towing and steering device for a vehicle, comprising a clamp for gripping the axle, a lever pivoted to said clamp and having means at one end for connecting to the steering tie-rod, and an auxiliary bar having one end attached to the rear end of said lever and bent downwardly and under said axle and tie-rod to be engaged at its opposite end by said towpole.

9. In combination with a vehicle having the steering tie-rod forward of the front axle, a towing and steering device for a vehicle, comprising a clamp for gripping the axle, a lever pivoted to said clamp and having means at one end for connecting to the steering tie-rod, and an auxiliary connector member having one end attached to the rear end of said lever and bent downwardly to extend forwardly beneath said axle and tie-rod and bifurcated at its opposite end to receive the end of a towpole.

In testimony whereof I affix my signature.

SAMUEL ANGROVE.